United States Patent [19]

Tsuchitani et al.

[11] Patent Number: 5,240,613

[45] Date of Patent: Aug. 31, 1993

[54] PROCESS FOR REGENERATING CLOGGED FILTERS

[75] Inventors: Masatoshi Tsuchitani, Ichihara; Sakae Naito, Chiba; Ryoichi Nakajima, Ichihara; Kensuke Iuchi, Chiba; Shintaro Hasebe, Ichihara, all of Japan

[73] Assignee: Maruzen Petrochemical Co., Ltd., Tokyo, Japan

[21] Appl. No.: 926,816

[22] Filed: Aug. 7, 1992

[30] Foreign Application Priority Data

Aug. 15, 1991 [JP] Japan .................... 3-229431

[51] Int. Cl.$^5$ .................... B01D 24/46
[52] U.S. Cl. .................... 210/636; 210/106; 210/791; 210/785
[58] Field of Search .................... 210/636, 791, 500.25, 210/500.26, 106, 785; 208/221

[56] References Cited

U.S. PATENT DOCUMENTS

| 2,101,012 | 4/1937 | Pond et al. | |
| 4,740,308 | 4/1988 | Fremont et al. | 210/636 |
| 4,844,809 | 7/1989 | Ashina et al. | 210/636 |
| 4,865,752 | 9/1989 | Jacobs | 210/791 |

FOREIGN PATENT DOCUMENTS

| 3627932 | 3/1987 | Fed. Rep. of Germany . | |
| 35899 | 4/1978 | Japan | 210/791 |
| 129107 | 10/1980 | Japan | 210/636 |
| 159808 | 12/1980 | Japan | 210/636 |
| 175504 | 9/1985 | Japan | 210/636 |
| 3321741 | 12/1984 | Netherlands | 210/791 |
| 2248559 | 4/1992 | United Kingdom . | |

OTHER PUBLICATIONS

Soviet Inventions Illustrated, Section Ch, Week 8406, Derwent Publications, Ltd., London GB; Class J01, AN 84-035471 and SU-A1 007 702 (V. P. Zuev) Mar. 30, 1983.

Primary Examiner—Robert A. Dawson
Assistant Examiner—Ana M. Foetung
Attorney, Agent, or Firm—Melvin I. Stoltz

[57] ABSTRACT

When preparing carbon artefacts from heavy oils of petroleum or coal origin, removal of undesirable components or recovery of desirable components from raw materials or intermediates is usually required so as to improve the quality of the final products. Such removal or recovery operation is conventionally done by filtration. In the past, regeneration of filters clogged with solid carbonaceous materials inevitably formed by the filtration operations is difficult and troublesome procedures. Herein disclosed is a simple and effective process for regenerating filters clogged with solid carboneceous materials, characterized by treating the filter medium in an aqueous solution of hydrogen peroxide with heating and then optionally conducting ultrasonic washing in water or a solvent. By this simple process, clogged filters can be regenerated completely to show the same filtration performance as new filters.

12 Claims, 2 Drawing Sheets

PROCESS FOR REGENERATING CLOGGED FILTERS

BACKGROUND OF THE INVENTION

1. Field of the Invention

The present invention relates to a process for regenerating a filter which has been clogged and rendered inutile by solid carbonaceous materials contained in heavy oils or pitches derived from petroleum or coal, and, in particular, to a process for regenerating a filter, which has been clogged and rendered inutile by solid carbonaceous materials contained in heavy oils or pitches derived from petroleum or coal, comprising immersing the filter in an aqueous solution of hydrogen peroxide with heating, thus removing the solid carbonaceous materials clogging the filter. One preferred embodiment of the process of the present invention relates to a process for regenerating a filter, which has been clogged and rendered inutile by solid carbonaceous materials contained in heavy oils or pitches derived from petroleum or coal, comprising immersing the filter in an aqueous solution of hydrogen peroxide, heating it at a temperature between 50°-100° C., removing the aqueous solution of hydrogen peroxide, then, if required, further treating the filter by an ultrasonic wash, thus removing the solid carbonaceous materials clogging the filter.

2. Description of the Prior Art

Various types of carbon or graphite materials such as binder pitches, electrodes, graphite blocks, carbon fibers, and the like are manufactured from heavy oils such as residuum of the crude oil vacuum distillation unit, decant oil obtained in FCC unit, naphtha tar, i.e., bottom oil of ethylene plant, or the like; coal tars and the like produced in coke ovens; or pitches obtained from any of these, as raw materials. In the manufacture of these products, undesired components, such as components of an extremely high molecular weight contained in the raw material, free carbon, coke or extremely heavy components produced during the manufacturing process, as well as solid materials, are conventionally removed to ensure a higher quality of the target products. Also, it is very often conducted that as one of the manufacturing processes, an intermediate product obtained by removing the above-mentioned undesired components is subjected to a thermal polymerization process under specific conditions to recover only components polymerized by the thermal polymerization. In the removal of these undesired components from the raw material or from the intermediate product from the manufacturing process, or in the recovery only of the polymerized component in the product from the thermal polymerization process for the intermediate product from which the undesired components have been removed, the raw material, the intermediate product, or the thermally polymerized component contained in the intermediate product from which undesired component has been removed is generally dissolved in a suitable solvent or melted by heating to deposit such undesired components or polymerized components and to remove or recover them as undissolved or unmelted components. In this instance, these undissolved or unmelted components are removed or recovered by means of a filter. The major portion of the undissolved or unmelted components is made up of carbonaceous compounds consisting of carbon and hydrogen, even though it contains small amounts of metallic compounds, or nitrogen, sulfur, and silicon compounds, particularly in the case where they are derived from deposition of undesired components. In the present invention, the undissolved or unmelted components, both in the case where they are derived from deposition of undesirable components which are to be removed and in the case where they are deposited polymerized components which are the target material, are herein referred to as "solid carbonaceous materials". Also, in the present invention, the above-mentioned heavy oils such as the crude oil vacuum distillation residuum, FCC decant oil, naphtha tar, or the like; coal tars and the like produced in coke ovens; or pitches obtained from these heavy oils or coal tars, as well as intermediate products from the manufacturing process and the materials from the thermal polymerization process for the intermediate product from which the undesired components have been removed, are collectively referred to as "heavy oils or pitches derived from petroleum or coal".

Taking the manufacture of carbon fiber by spinning from molten pitch as a specific example, removing solid carbonaceous materials with a diameter of several microns from the pitch is essential. The reason is that they can be a cause of the fiber cutoff during the melt spinning of carbon fiber since carbon fiber has a diameter of less than ten and several microns and the existence of solid carbonaceous materials can also impair the characteristics of the carbon fiber. Normally, a filter with an aperture of several microns to several tens of microns is provided immediately before the spinning operation to remove the solid carbonaceous materials in the pitch, or a method is adopted by which the spinning apparatus is charged with pitch from which the solid carbonaceous materials have been removed by prior filtration. It is thus possible to manufacture a good carbon fiber in a stable manner by filtering the raw material immediately before the spinning nozzle or by a similar method.

Generally, materials such as metals, glass, polymers, papers, or the like are used as a filter medium. These filter media can be provided in many forms, such as a woven or non-woven fabric, or a porous member formed from sintered or bound particles. Among these, from the aspect of ensuring excellent resistance to corrosion, heat and solvents, a metal, particularly stainless steel, or glass is mainly used as the filter medium for removing solid carbonaceous materials contained in heavy oils or pitches derived from petroleum or coal. Stainless steel filters include stainless steel in the form of sheets of woven or non-woven fabric, a sintered metal formed by sintering minute particles of stainless steel, and the like. They are provided as sheets, cylinders, or units with a large filtration area formed by providing ribs in the axial direction of the cylinder. In addition, a unit made from layered fabrics with a number of fiber sheets having apertures with different sizes or a very thick filter medium can be utilized to improve filtering performance or resistance to filtering pressure.

In the removal of solid carbonaceous materials from heavy oils or pitches derived from petroleum or coal (hereinafter referred to as "heavy oils") by filtration, the solid carbonaceous materials build up on the surface of the filter medium, causing the filtering pressure to rise and reducing the rate of filtration. When the pressure goes up beyond a certain level or the rate of filtration falls below an acceptable range, the filter medium must be changed or regenerated to remove the solid carbonaceous materials built up on its surface. It is possible to scrape away the solid carbonaceous materials built up on the surface of the filter medium relatively easily, but because the filter medium itself has a certain thickness, there are many cases where the solid carbonaceous materials penetrate into the filter medium and cause clogging. In such a case the removal of these materials and the regeneration of the filter medium are not easily accomplished. Methods hitherto used to remove the solid carbonaceous materials which have penetrated into the filter medium and caused clogging include washing the filter with an organic solvent, for example, immersing it in quinoline which is reputed to most efficiently dissolve heavy oils, then ultrasonically washing it or washing it under heating; ultrasonically washing the filter with an alkaline washing agent, e.g., with Contaminon (a product of Wako Pure Chemical Industries, Ltd., a kind of non-ionic surfactant, pH: ca. 10), etc.; and the like. However, with these methods it is impossible to completely remove the solid carbonaceous materials from inside of the filter medium. Thus, regenerating the filter medium to restore a performance equivalent to a new filter medium is extremely difficult. When the filter medium is made of glass, it is known to be possible to completely remove the solid carbonaceous materials by immersing the filter medium in a solution containing chromic acid, but the effect on the environment of the chromium ions contained in the waste liquid is a problem. Significant cost is involved in disposing of this waste liquid. In addition, the regeneration with a chromic acid solution cannot be applicable to the treatment, for example, of pitch used to manufacture carbon fiber, since a metallic filter medium with a sufficient strength must be used for such a filtration.

If a filter medium which has not been adequately regenerated is reused, an increase in filtering pressure or a drop in the rate of filtration is occurred within a very short time. The filter exchange cycle must therefore be shortened, and the works involved in the exchange and regeneration of filter media are very troublesome. In many cases, the filter medium must be discarded only by the use of several times, and in extreme cases, the filter medium used for the manufacture of carbon fiber, for example, is discarded without a reuse, resulting in a great increase in production costs.

SUMMARY OF THE INVENTION

Because of this situation there exists the need for a method by which the filter medium which is clogged by the solid carbonaceous materials as a result of processing of heavy oils can be effectively regenerated at low cost to restore the filtration performance equivalent to a new filter.

As a result of extensive studies with the object of developing a process for effectively regenerating filters clogged by the solid carbonaceous materials in heavy oils and restoring the filtration performance equivalent to a new filter, at low cost and with no problem with waste liquid disposal, the present inventors have found that such clogged filters can be completely regenerated by immersing them in an aqueous solution of hydrogen peroxide and treating them with heat.

Accordingly, an object of the present invention is to provide a process by which a filter medium clogged by the solid carbonaceous materials by the filtration of heavy oils can be regenerated to restore the filtration performance equivalent to a new filter, at low cost and with no waste liquid disposal problems.

Thus, the gist of the present invention resides in a process for regenerating a filter medium clogged with solid carbonaceous materials contained in heavy oils or pitches (heavy oils), characterized by treating said filter medium in an aqueous solution of hydrogen peroxide with heating.

DETAILED DESCRIPTION OF THE INVENTION

Figure 1:
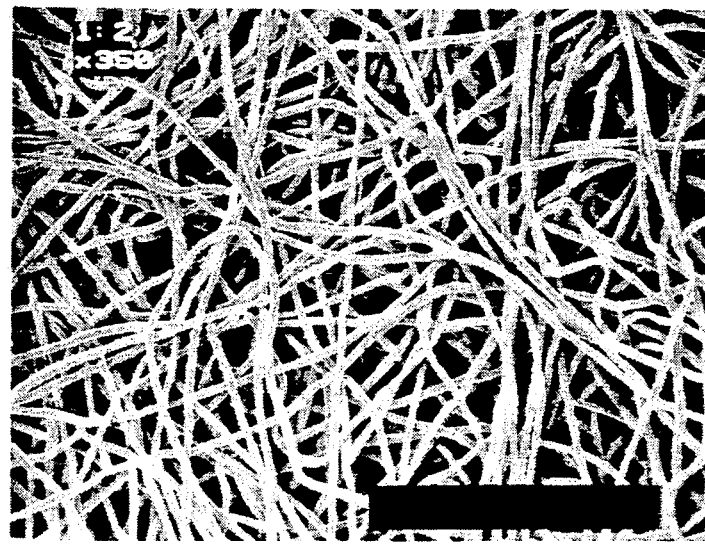
FIG. 1 is a scanning electron microscopic (hereinafter abbreviated as SEM) photograph of a filter medium with 5 micron apertures which had been regenerated by immersion in a 5 wt % aqueous solution of hydrogen peroxide, followed by ultrasonic washing in water, in Example 1.

Various types of materials can be utilized as the filter medium used to separate and remove the solid carbonaceous materials contained in the heavy oils. The process of the present invention is suited for regenerating a filter with a layered or laminated construction or a filter having a certain degree of thickness, made of a metal, in particular stainless steel, or glass. There are, of course, absolutely no problems in applying the process of the present invention to the regeneration of a filter medium of normal thickness. In the practice of the process of the present invention, it is more suitable that solid carbonaceous materials built up on the surface of the filter medium which was used for the filtration of heavy oils to remove solid carbonaceous materials and clogged with the solid carbonaceous materials are firstly removed, for example, by scraping them away, by washing with a solvent, or by ultrasonically washing, and then the process of the present invention is applied by immersing the filter in a 0.5 to 40 wt % aqueous solution of hydrogen peroxide and heating it to 50°–100° C. By the application of the process of the present invention, the solid carbonaceous materials clogging the inside of the filter medium are easily removed, or a condition allowing easy removal is obtained.

The details of the mechanism by which the filter medium is regenerated by the process of the present invention are unknown, but it is conjectured that the hydrogen peroxide decomposes the solid carbonaceous materials clogging the filter medium by oxidation, and, in addition, the impulse originated by the formation of bubbles due to the decomposition of the hydrogen peroxide and the impingement of the bubbles strip away the solid carbonaceous materials from the filter medium, thus providing conditions under which the solid carbonaceous materials are easily removed from the filter medium and the filter is regenerated. This conjecture is based on the fact that when a filter used to filter pitch for manufacturing carbon fiber by melt spinning, for example, is immersed in a 30 wt % aqueous solution of hydrogen peroxide and heated to 90° C., the production of bubbles which is believed to be produced by the decomposition of hydrogen peroxide is observed, and, after 15 minutes, the bubble generation becomes violent, the hydrogen peroxide solution forms a black suspension, which after 30 minutes turns almost colorless.

The concentration of the aqueous solution of hydrogen peroxide depends on the degree of clogging of the filter medium being regenerated. Specifically, this relates to the amount of solid carbonaceous materials existing within the filter medium. No particular problems occur in the regeneration of the filter if this concentration is within the range of 0.5 to 40 wt %, with 3 to 30 wt % being preferable. If this concentration is less than 0.5 wt %, the oxidation rate of the carbonaceous materials by hydrogen peroxide, and the generation of bubbles due to the oxidation by and decomposition of the hydrogen peroxide are very slight so that satisfactory regeneration of the filter medium does not occur. If a concentration greater than 40 wt %, and, in particular, greater than 60 wt %, is used in the process of the present invention, hydrogen peroxide itself may explosively react, and therefore, the use of such a high concentration is unpractical for the sake of safety. The use of such a high concentration is also uneconomical.

The temperature used in the treatment with hydrogen peroxide is preferably in the range of 50°-100° C. If lower than 50° C., the oxidation by the hydrogen peroxide does not sufficiently proceed, and no bubbles are created by the decomposition of the hydrogen peroxide or the amount of bubbles is too small. If the temperature exceeds this range the water is evaporated so rapidly, making it necessary to carry out the treatment under an increased pressure. In addition, the generation of gas from the decomposition of the hydrogen peroxide and the generation of gas produced by the oxidation of the solid carbonaceous materials become too violent, impairing the safety of the process operation.

Also, it is desirable to wash the filter with a solvent to remove the soluble portion prior to the hydrogen peroxide treatment in order to reduce the amount of hydrogen peroxide used and the time required for the treatment. Examples of solvents which can be used for this purpose include hexane, acetone, methyl alcohol, ethyl alcohol, benzene, toluene, xylene, cresol, benzene chloride, pyridine, quinoline, oils having a boiling point of lower than 350° C. obtained from coal tar or petroleum, and the like. Of these, solvents in which heavy oils are highly soluble, such as benzene, toluene, xylene, quinoline, pyridine, and the like, are preferable.

The treatment by the aqueous solution of hydrogen peroxide is usually continued until the generation of bubbles has almost ceased. For example, about one hour is required with a hydrogen peroxide concentration of 3 to 6 wt % at a temperature of 90° C. This also depends on the amount of solid carbonaceous materials deposited in the filter. Even though there is no particular problem if the process is halted while bubbles are still being generated, the effects of the present invention cannot be exhibited unless the treatment is continued at least about 10 minutes.

If desired, it is possible to add an acidic material such as acetic acid to the aqueous solution of hydrogen peroxide so as to accelerate the oxidation reaction and increase the decomposition rate of hydrogen peroxide.

Washing the filter treated by hydrogen peroxide with water or, further, washing it ultrasonically, to remove the solid carbonaceous materials which have been stripped away from the filter media but remain in the filter is desirous in achieving a more complete regeneration of the filter. This ultrasonic washing may be performed in water. Either, the ultrasonic washing may be carried out in benzene, toluene, xylene, quinoline, pyridine, or the like with no problem. The ultrasonic washing for 5 minutes to one hour is generally satisfactory. When a black suspension of solid carbonaceous materials flow out from the filter during the ultrasonic washing, it is more preferable that the water is changed to continue the washing until there is no further flow of this black suspension.

Hydrogen peroxide is contained in the waste liquid after the hydrogen peroxide treatment, but the concentration is rather low. In particular, if the treatment is continued until the generation of bubbles is ceased, only a minute amount of hydrogen peroxide is present in the waste liquid. This waste liquid can be easily processed by decomposing the small amount of contained hydrogen peroxide into water and oxygen using a hydrogen peroxide decomposition catalyst such as manganese dioxide, so that there is absolutely no adverse effect on the environment.

The present invention will now be explained in more detail taking the regeneration of filters used in the manufacture of carbon fiber as an example. Disk-shaped stainless steel (SUS 304) fiber filters of 30 mm diameter, in which individual filter leaves with apertures of 100 micron, 30 micron, and 5 micron across the direction of flow of the pitch are stacked in layers, which had become clogged during the melt spinning of pitch in the manufacture of carbon fiber, were removed from the spinning apparatus and immersed in aqueous solutions of hydrogen peroxide of 5, 10, and 30 wt % concentration, respectively, and then heated to 90° C. After the commencement of the heating, the generation of bubbles, which is considered to be from the decomposition of the hydrogen peroxide, was observed. This bubble formation became violent after several minutes and the hydrogen peroxide solution formed a black suspension. In all cases the generation of bubbles ceased after one hour. The black suspension remained in the 5 wt % and 10 wt % hydrogen peroxide solutions, but in the 30 wt % solution the black suspension faded and turned almost colorless on completion of the treatment. The formation of the black suspension is considered to be the result of stripping of the pitch and solid carbonaceous material adhering to the filters away from the filter by oxidation with hydrogen peroxide. The stripping is further promoted by the generation of the bubbles. In the case of the 30 wt % hydrogen peroxide solution, it is believed that the oxidation reaction progresses further so that the pitch and solid carbonaceous materials are almost completely decomposed, resulting in an almost colorless solution after the treatment is completed. The black suspension flowed out, when the filters treated by the 5 wt % and 10 wt % solutions of hydrogen peroxide were ultrasonically washed in water, but after washing in water, no further formation of black suspension was observed, when they were submitted again to an ultrasonic wash. Then, the filters were dismantled to separate the 100 micron, 30 micron, and 5 micron filter leaves, respectively. No solid carbonaceous material was observed by the naked eye. In addition, on examination under a scanning electron microscope (SEM), all filter leaves were found to be free of adhered materials, and the filters themselves were confirmed to be in no way damaged. This confirmed that regeneration had proceeded sufficiently to allow the filters to be reused. On the other hand, when filters which had been clogged in the same manner as described above were subjected to ultrasonic washing in quinoline for one hour and subsequently washed with benzene, followed by washing with acetone, the examination under an SEM in the same manner as outlined above revealed the presence of a considerable amount of materials adhered to the inside of the filter medium.

As an another embodiment, in order to remove sooty materials (referred to as free carbon) or to remove extremely high molecular weight components contained in coal tar, coal tar was mixed with 3 times by weight of quinoline and filtered through a G4 glass filter with a diameter of 20 mm and a thickness of 2 mm to remove the above-mentioned sooty materials and extremely high molecular weight components. After the filtration, the solid carbonaceous materials accumulated on the upper surface of the filter were firstly removed from the G4 glass filter by scraping, and then the filter was washed ultrasonically in quinoline for one hour to remove the soluble material existed in the filter. The quinoline was then removed with acetone and the acetone was removed by a further water wash to regenerate the filter. Prior to use, the filter was white, but after use, even after the above-mentioned operation had been performed, the filter was black due to the solid carbonaceous materials not completely removed. Then, according to the process of the present invention, the filter was immersed in a 5 wt % aqueous solution of hydrogen peroxide. When heated to 90° C., the generation of bubbles and formation of a black suspension were observed, and after one hour, the bubble generation in the black suspension almost ceased. After this treatment, the filter was ultrasonically washed in water, at which time the black suspension was observed to flow. The filter became completely white, demonstrating that the solid carbonaceous materials had been removed. In addition, in order to compare the performance of the filter prior to use, the filter after regeneration by means of a quinoline wash, and the filter after regeneration by the process of the present invention, one liter of water was passed through the respective filters at a reduced pressure to measure the time required for the pass. It was found that the pass through the new filter and the pass through the filter regenerated by the process of the present invention were completed in 2 minutes and 30 seconds in both cases, but the pass through the filter which was regenerated by washing with quinoline required 6 minutes. This confirmed that it was possible to regenerate a filter by the process of the present invention to the same filtration performance as a new filter.

As illustrated in the foregoing description, the process of the present invention can be applied for regenerating a filter which has been used to remove solid carbonaceous materials contained in heavy oils and can completely remove the solid carbonaceous materials which have caused clogging of the filter medium, restoring the performance of the filter equivalent to that of a new filter. In addition, the waste liquid from the process of the present invention can be easily treated so that it has no adverse effect on the environment.

DESCRIPTION OF THE PREFERRED EMBODIMENTS

The present invention will now be explained in detail with reference to the following examples, which are in no way limitative of the scope of the invention.

EXAMPLE 1

Four used filters were obtained by filtering one kilogram of pitch with a softening point of 306° C. and containing 0.5 wt % of quinoline insoluble components at a pressure of 15 Kg/cm$^2$ and a temperature of 350° C., using stainless steel (SUS 304) fiber filters of 30 mm diameter, in which individual filter leaves with apertures of 100 micron, 30 micron, and 5 micron were stacked in layers. After scraping off the pitch and solid materials accumulated on the upper surface of the filter, the following treatments were performed on the four filters, respectively.

(1) Immersion in a 5 wt % aqueous solution of hydrogen peroxide, heating to 90° C. for one hour, followed by ultrasonic washing in water.

(2) Immersion in a 10 wt % aqueous solution of hydrogen peroxide, heating to 90° C. for one hour, followed by ultrasonic washing in water.

(3) Immersion in a 30 wt % aqueous solution of hydrogen peroxide, followed by heating to 90° C. for one hour.

(4) Ultrasonic washing for one hour in quinoline, followed by washing in acetone.

The 5 micron filter leaves were then removed from the filters which had been treated as outlined above and examined under the SEM. No adhered material was observed in either of the filters which had been treated in an aqueous solution of hydrogen peroxide according to the present invention, and in addition, no damage to the filaments of the filter was observed. In the filter subjected to the ultrasonic washing in quinoline, however, a large amount of adhered material was observed.

Figure 2:
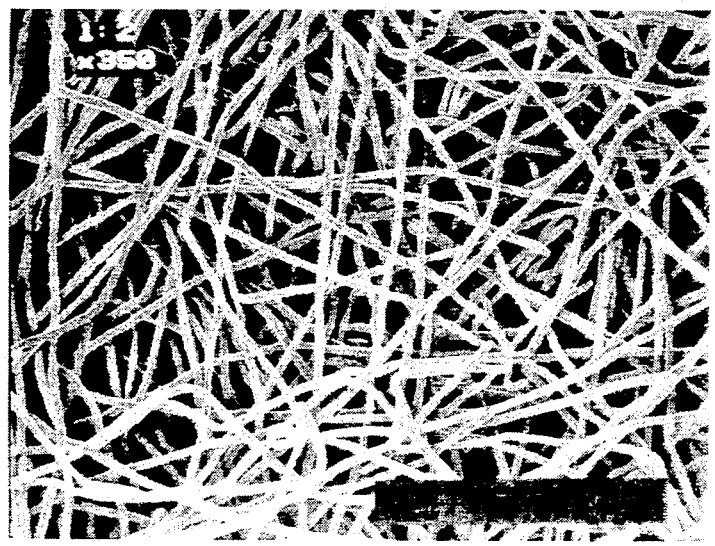
FIG. 2 is an SEM photograph of a filter medium with 5 micron apertures which had been regenerated by immersion in a 30 wt % aqueous solution of hydrogen peroxide, in Example 1.
Figure 3:
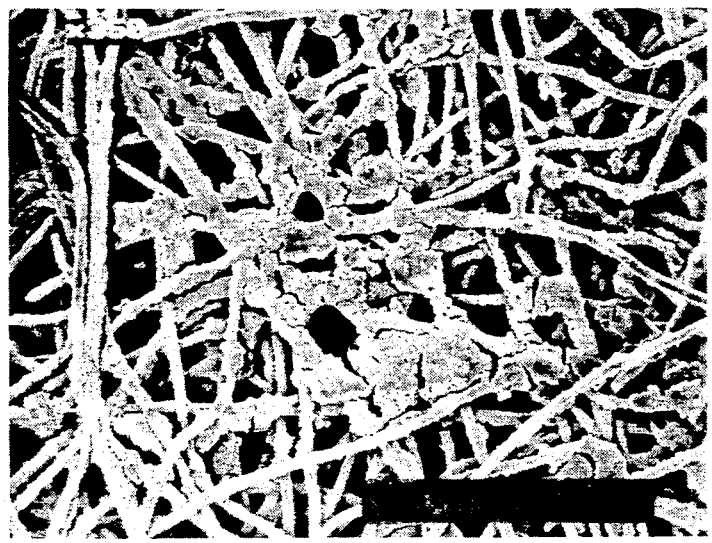
FIG. 3 is an SEM photograph of a filter medium with 5 micron apertures which had been regenerated by ultrasonic washing in quinoline, in Example 1.

FIGS. 1 to 3 are SEM photographs of the 5 micron aperture filter leaves which had been immersed in the 5 wt % aqueous solution of hydrogen peroxide, followed by ultrasonic washing in water; immersed in a 30 wt % aqueous solution of hydrogen peroxide; and ultrasonically washed in quinoline, respectively. Table 1 gives data on the relationship between the methods of treatment and the photographs.

TABLE 1

| Concentration of hydrogen peroxide (% by weight) | Ultrasonic water washing after hydrogen peroxide treatment | FIG. No. |
|---|---|---|
| 5 | Performed | 1 |
| 30 | Not performed | 2 |
| Ultrasonic washing in quinoline for one hour | | 3 |

The process of the present invention was thus confirmed to regenerate a filter to a condition equivalent to that of a new filter.

EXAMPLE 2

One gram of the pitch used in Example 1 was mixed with 30 ml of pyridine to dissolve. About 40 wt % of the pitch remained insoluble in pyridine and formed a suspension. This suspension was filtered through a G4 glass filter with a diameter of 20 mm and a thickness of 2 mm. After filtration, the solid carbonaceous materials accumulated on the surface of the filter were firstly removed by scraping, then the filter was washed ultrasonically in quinoline for one hour to remove the soluble material existed in the filter. The quinoline was then removed with acetone and the acetone was removed by a further water wash to regenerate the filter. Prior to use, the filter was white, but became black after use and remained black even after the above-mentioned operation. Then, the G4 glass filter which had been subjected to the above-mentioned operation was immersed in a 5 wt % aqueous solution of hydrogen peroxide and heated to 90° C. for one hour and 30 minutes. This filter was then ultrasonically washed in water to confirm that the filter became completely white. In order to compare the performance of the filter prior to use, after regeneration by means of a quinoline wash, and after regeneration by the process of the present invention, one liter of water was passed through the respective filters under a reduced pressure to measure the time required for the pass. The time required for the pass for the filter prior to use and for the filter regenerated by means of the process of the present invention was 2 minutes and 30 seconds, while the filter which was regenerated by washing with quinoline required 6 minutes for the pass.

This confirmed that it was possible to regenerate a filter by the process of the present invention to the same filtration performance as a new filter.

EXAMPLE 3

One part of pitch with a softening point of 250° C. and containing 0.5 wt % of quinoline insoluble components was mixed with 3 parts of quinoline. The solution was filtered at a rate of 10 liter/hour for 2 hours at 110° C. through a cylindrical sintered metal filter (Porous Stainless Steel Filter, manufactured by Nihon Pall Ltd.) sealed at one end, 60 mm diameter and 240 mm length, with 5 micron apertures and 2 mm thickness (filter area: 0.045 $m^2$). During the filtration, the pressure differential (difference between the filter inlet and outlet pressures) rose from 0.5 $Kg/cm^2$ to 2 $Kg/cm^2$. Using three filters, the operations above were repeated respectively. After the solid materials accumulated on the surface of the filters were removed, the filters were ultrasonically washed for 2 hours in quinoline. The each surface of the filters remained black after this treatment. Two such filters which had been ultrasonically washed in quinoline were treated as follows:

(1) One filter was regenerated by immersing it in a 5 wt % aqueous solution of hydrogen peroxide, heating to 90° C. for one hour, and ultrasonically washing in water, according to the process of the present invention.

(2) The other filter was placed in an electric furnace at 500° C. to regenerate it by burning for one hour in a stream of air at 5 liter/min.

The filter treated by process (1) of the present invention had a silver-white color, the same as that before use, after the regeneration, while the filter subjected to burning in an air stream by process (2) was partly reddish-brown in color due to rust formation and formed cracks so that it was no longer usable.

A water filtration test was carried out to compare the performance of three filters. The first filter was a new filter, the second filter was the filter regenerated by the process of the present invention, and the third filter was the filter regenerated only by ultrasonic wash in quinoline. In this test, the cylindrical filter was placed in a container full of water. The opening of the filter for taking out the filtrate was positioned above the water surface so that water could not enter through this opening. The water was allowed to permeate through the filter into the internal section to measure the time required for the water levels inside and outside of the filter to equalize. This took about one minute for both the new filter and the filter which had been regenerated by the above process (1) of the present invention. In the case of the filter regenerated by ultrasonic washing in quinoline, the water level inside the filter had only reached about ⅔ of the external level even after 10 minutes.

EXAMPLE 4

One part by weight of the pitch used in Example 3 was mixed with 3 times its weight of quinoline, and a solid portion was roughly removed by means of a continuous centrifuge. The solution was filtered by a cylindrical stainless steel random fiber filter (Filterlite Dynalloy Cartridge, manufactured by Nihon Memutec Co.), maximum diameter 50 mm, length 250 mm, apertures 3 micron, filtration area 0.19 $m^2$, with ribs to provide a large filtration area, for 8 hours at a rate of 100 liter/hour, during which time the pressure differential rose from 0.1 $Kg/cm^2$ to 5 $Kg/cm^2$. The solid materials accumulated on the surface of the filter were removed, and the filter was washed ultrasonically in quinoline. The filter was then immersed in a 5 wt % aqueous solution of hydrogen peroxide and heated to 90° C. for one hour, followed by an ultrasonic wash in water, according to the process of the present invention. Another filter which had been washed ultrasonically in quinoline in the same way as above was immersed for one hour in molten salt (NeoSK-SALT: tradename, a product of Soken Chemical Co., Ltd.; composition: 40 wt % sodium sulfite, 53 wt % potassium nitrate, and 7 wt % sodium nitrate) at 500° C. to burn out the solid materials, then washed with water. The filter regenerated by the process of the present invention took on a silver-white color, the same as the color of a new filter. In the filter subjected to the process of burning in molten salt, the random fiber was oxidized and tattered so that the filter could not be reused. The performance of these regenerated filters was measured by the method used in Example 3. The water levels inside and outside of the filter equalized in about three seconds for both a new filter and the filter which had been regenerated by the process of the present invention, while it took about three minutes for the filter regenerated only by ultrasonic washing in quinoline.

What is claimed is:

1. A process for regenerating a filter medium made of a metal or a glass clogged with solid carbonaceous materials contained in heavy oils or pitches, which comprises treating said filter medium in an aqueous solution of hydrogen peroxide at a temperature ranging between about 50° C. to 100° C.

2. A process according to claim 1, wherein the concentration of said aqueous solution of hydrogen peroxide is 0.5% to 40% by weight.

3. A process according to claim 1, wherein said heat treatment in an aqueous solution of hydrogen peroxide is carried out for a period of time longer than 10 minutes.

4. A process according to claim 1, wherein said metal is a stainless steel.

5. A process according to claim 1, wherein the concentration of said aqueous solution of hydrogen peroxide is 0.5% to 40% by weight and said heat treatment in an aqueous solution of hydrogen peroxide is carried out for a period of time longer than 10 minutes.

6. A process according to claim 5, wherein said metal is a stainless steel.

7. A process according to claim 1, wherein said clogged filter is ultrasonically washed after said heat treatment in an aqueous solution of hydrogen peroxide.

8. A process according to claim 7, wherein the concentration of said aqueous solution of hydrogen peroxide is 0.5% to 40% by weight.

9. A process according to claim 7, wherein said heat treatment in an aqueous solution of hydrogen peroxide is carried out for a period of time longer than 10 minutes.

10. A process according to claim 7, wherein said metal is a stainless steel.

11. A process according to claim 7, wherein the concentration of said aqueous solution of hydrogen peroxide is 0.5% to 40% by weight and said heat treatment in an aqueous solution of hydrogen peroxide is carried out for a period of time longer than 10 minutes.

12. A process according to claim 11, wherein said metal is a stainless steel.

* * * * *